UNITED STATES PATENT OFFICE.

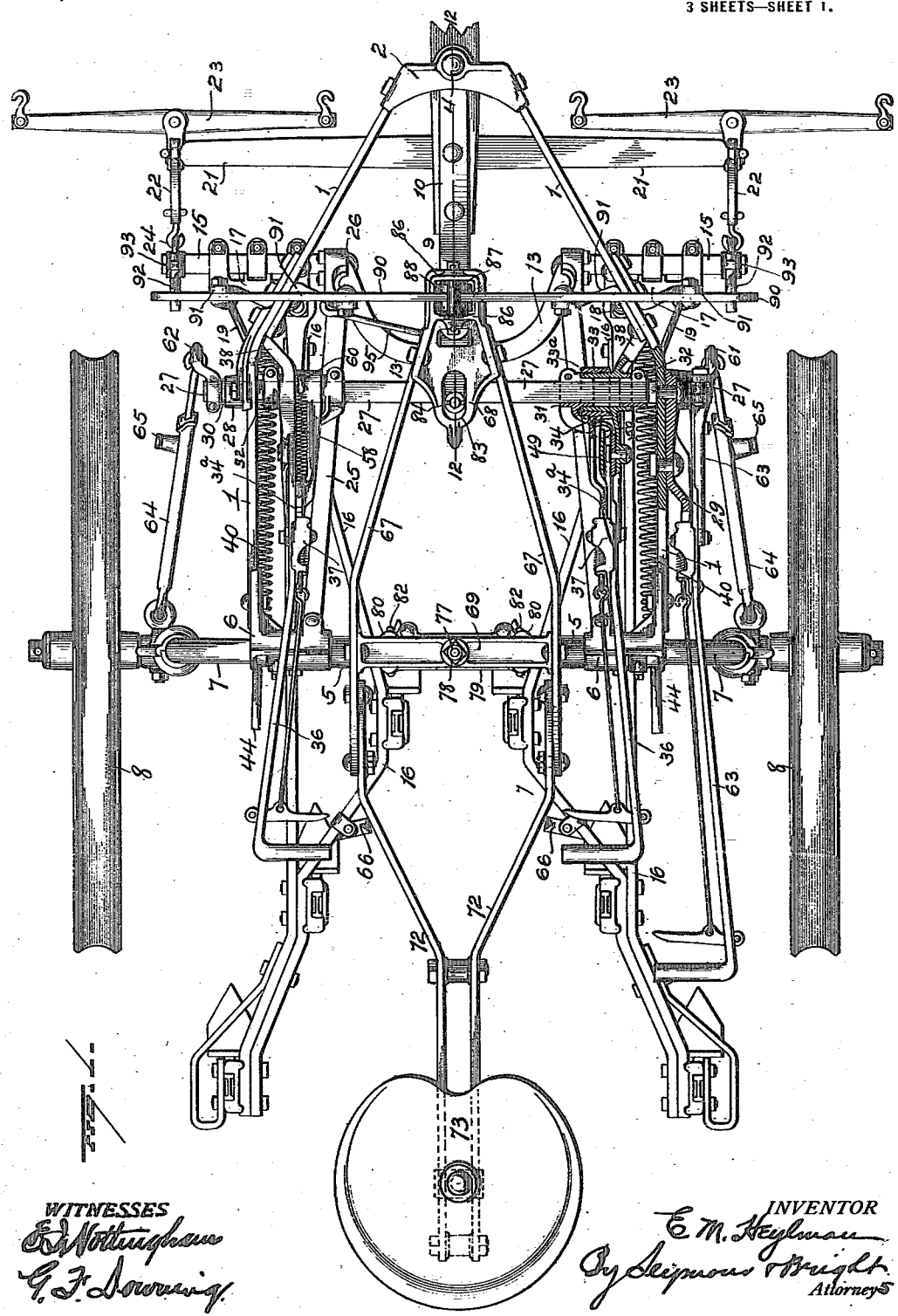

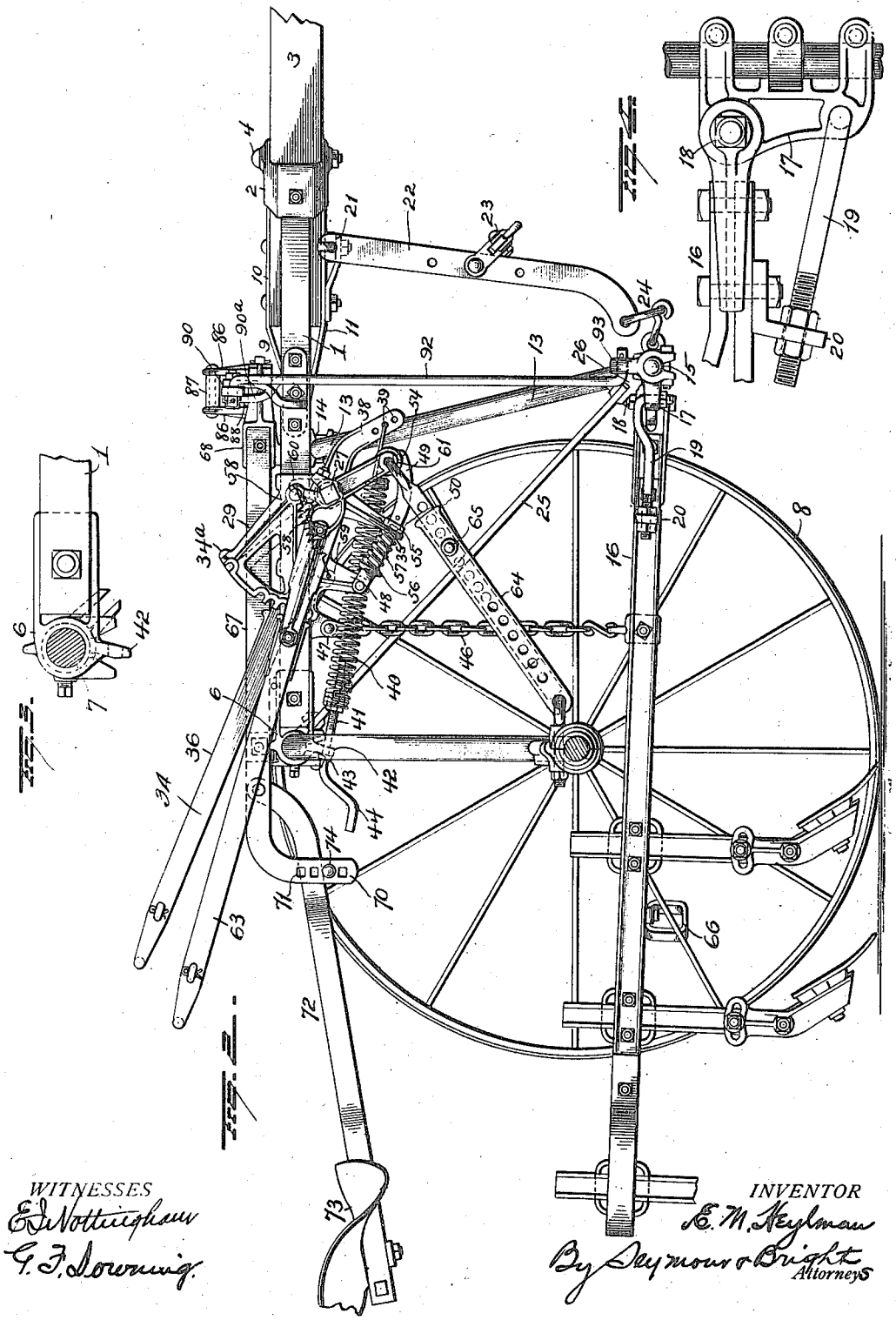

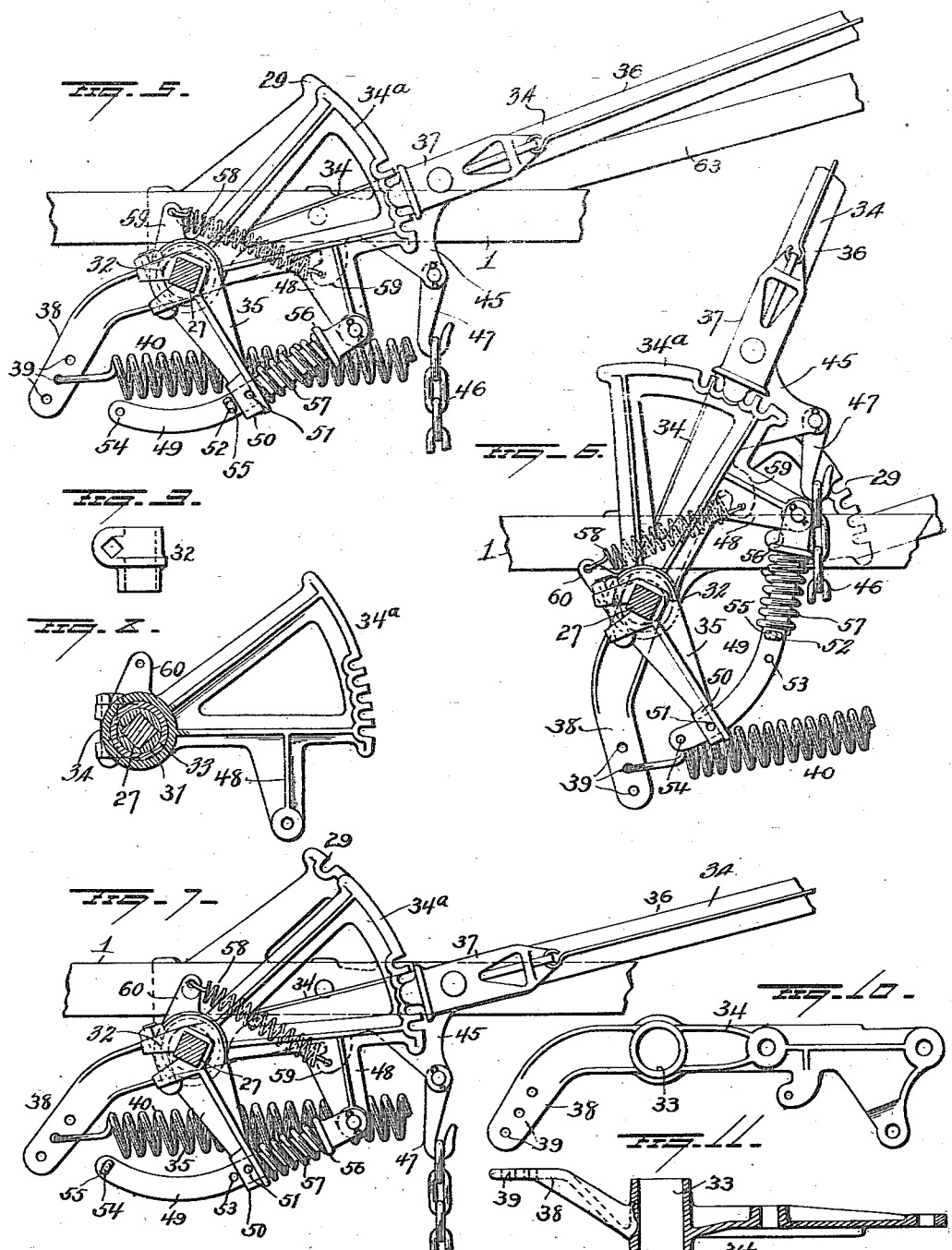

EDWARD M. HEYLMAN, OF SOUTH BEND, INDIANA, ASSIGNOR TO OLIVER CHILLED PLOW WORKS, OF SOUTH BEND, INDIANA.

CULTIVATOR.

1,216,568.      Specification of Letters Patent.      Patented Feb. 20, 1917.

Application filed December 16, 1915. Serial No. 67,231.

*To all whom it may concern:*

Be it known that I, EDWARD M. HEYLMAN, a citizen of the United States, and a resident of South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in wheeled cultivators, and more particularly to that type in which at least two cultivator gangs are employed and in which means are provided for raising, lowering or adjusting said cultivator gangs simultaneously or separately,—one object of the invention being to provide a means whereby various kinds of adjustment of the raising and lowering mechanism, may be effected to meet different conditions under which the cultivator may be operated.

A further object is to provide means whereby the weight of the gangs may be utilized to keep the soil engaging members in operative relation to the ground, especially when the ground is hard and "sweeps" are employed instead of shovels.

A further object is to so construct the cultivator gang controlling means, that said gangs may be balanced and capable of being easily raised or lowered by the operator, either manually or with the use of his feet to free the shovels from accumulated trash, such as sod, weeds and corn stalks.

A further object is to so construct the cultivator and its manually operable controlling and adjusting mechanism, that the operator may raise the cultivator gangs or force the shovels down into depressions in the field without changing the position of the manually operable lever relatively to its toothed segment or sector.

A further object is to construct the mechanism in such manner, that the operator may force the gangs down into depressions with the use of his feet, but so that the gangs cannot be raised except with the use of manually operable means.

With these and other objects in view, the invention consists in certain novel features of construction and combinations of parts as hereinafter set forth and pointed out in the claims.

In the accompanying drawings; Figure 1 is a plan view (partly in section) of a cultivator embodying my improvements; Fig. 2 is a side elevation of the same; Fig. 3 is a detail view of the devices whereby the balance-spring adjusting screws are connected with the cultivator frame; Fig. 4 is a detail view showing the coupling and adjusting devices between the beam or frame of one of the cultivator gangs and the front arch; Figs. 5, 6 and 7, are detail views in side elevation showing different adjustments of the operating and controlling mechanism; Fig. 8 is a view showing one of the segments $34^a$ in elevation and its mounting on the shaft 27 in section; Fig. 9 is a detail view of the sleeve constituting a part of said segment mounting; Fig. 10 is a face view of one of the levers 34; and Fig. 11 is a sectional view of said lever.

1, 1, represent the frame bars having their forward portions bent toward each other and connected at their forward ends by means of a bracket 2,—a tongue 3 being pivotally connected with the latter, as at 4. The rear ends of the bars 1 are rigidly connected with a horizontal tubular bar 5, through the medium of sleeved brackets 6,—said bar constituting the rear end of the frame and also forming, in effect, a portion of a rear arch axle, the respective members 7, 7, of the latter being mounted in said tubular bar and in the hubs of carrying wheels 8.

The pole 3 is provided with a rearward extension 9 (which may comprise two metal bars 10—11 secured to the upper and lower faces of the tongue and secured together rearwardly of the tongue, as shown at 12 Fig. 12) and with said rearward tongue extension, a front arch 13 is connected through the medium of a coupling 14 which is keyed to said arch and pivotally connected with the tongue extension 9, as shown in Fig. 12. The lower ends of the respective members of the front arch 13 are made with laterally projecting horizontal arms 15, for attachment of cultivator gang frames 16. In effecting such connections between the gang frames and the arms of the front arch, couplings 17 are mounted on said arch arms (Fig. 4) and with these couplings, the gang frames are pivotally connected by vertical pivots as shown at 18, Fig. 4. The pivotal connection between the gang frame and coupling is located near one end of the latter and a rod 19 is attached to said coupling near its other end,—the rear end of said rod being threaded and adjustably connected with a bracket 20 secured to and projecting laterally from the gang frame,—such construction affording means for adjusting the gang frames laterally.

An evener bar 21 is pivotally connected between its ends to the tongue 3 and with respective ends of said bar, depending draft equalizers 22 are pivotally connected. These vertical equalizer bars are adapted for the adjustable attachment of swingletrees 23, and at their lower ends, said equalizer bars are connected with the arms of the front arch by means of suitable links 24. Brace bars 25 are attached at their forward ends to brackets 26 mounted on the front arch arms and extend rearwardly and upwardly therefrom,—the rear ends of said brace bars being attached to the brackets 6 at the rear end of the main frame.

A transverse operating shaft 27 preferably angular in cross section is supported in bearings secured to the side bars of said frame,—one of said bearings being indicated at 28 and the other bearing being provided in a depending portion of a segment 29 secured to the main frame. When the shaft 27 is angular in cross section, suitable sleeves 30 will of course be provided to afford proper revoluble mountings of said shaft in its bearings on the frame.

Mechanisms are provided for raising, lowering and adjusting the cultivator gangs, and as these mechanisms for the respective gangs are the same in construction, a specific description of one such mechanism will suffice for both. In constructing each of said mechanisms, two sleeves 31 and 32, clamped to the shaft 27, afford bearings in said shaft, for the hub 33 of a lever member 34. On the hub 33, the hub 33ª of a segment 34ª is loosely mounted. The sleeve 31 constitutes the hub of an arm 35 depending from the shaft 27, as clearly shown in Figs. 5, 6 and 7, for a purpose hereinafter explained.

The lever 34 is provided with a handle member 36 and a suitable, manually operable detent mounted in a housing 37 on said lever, and the lower bent arm 38 of said lever is provided with a plurality of perforations 39 for the adjustable attachment of one end of a spring 40. The other end of this spring is provided with a plug having a threaded opening for the passage of a threaded rod 41,—said rod being mounted loosely in a lug 42 on bracket 6 and provided with a fixed collar 43 to bear against said lug. The rod 41 is provided at its free end with a crank arm 44 whereby it may be turned to adjust the tension of the spring. The purpose of the spring 40 is to balance the cultivator gang, the latter being connected with an arm 45 on the lever 34, through the medium of a chain 46 attached at one end to the guard frame and connected at its other end with a hook 47 attached to said lever arm 45.

The segment 34ª is provided with an arm 48 depending from its rear edge, and to this arm, one end of a link 49 is pivotally connected. The forward portion of this link is curved and passes through a hollow boss 50 at the free end of the depending arm 35, said boss having a perforation 51 and the link having perforations 52, 53, 54, for the reception of a cotter pin 55, for a purpose hereinafter explained. The link 49 is provided near its pivoted end with a fixed collar or abutment 56 against which one end of a spring 57 (encircling the link) bears,—the other end of said spring normally bearing against the boss 50 of arm 35, or against the cotter pin 55 when the latter is located in the position shown in Fig. 6.

It will be observed that the lever 34 and segment 34ª are both loosely mounted on the shaft 27, and in order to prevent the segment from moving when the lever 34—36 is operated, a spring 58 is attached at one end to a lug 59 on lever 34 and at the other end to an arm 60 on the hub of the segment 34ª. The spring 58 also acts to limit downward movement of the segment 34ª.

Arms 61—62 are secured to and depend from respective ends of the shaft 27,—the arm 61 preferably forming an extension of a lever 63 secured to said shaft. This lever is provided with a suitable detent to engage the toothed segment 29. The arms 61, 62 are connected with the respective arch-axle members by means of adjustable connecting rods 64, each comprising longitudinally adjustable members normally secured against relative movement, by means of latch devices 65.

The lever 63 is for the purpose of raising both cultivator gangs simultaneously and for balancing the frame. It will be seen that when this lever is moved forwardly, the rock-shaft 27 will be turned and as the levers 34—36 and their segments 34ª are connected with the shaft 27 through the medium of the link 49 and arm 35, motion will be imparted, through the medium of the chains 46 to the cultivator gangs for raising the latter. The operation of the lever 63 will also cause the carrying wheels to be shifted to the rear and thus automatically balance the gangs, either when they are raised or when they are in a working position.

The levers 34—36 may be operated to raise either gang independently of the other and either gang may be manipulated under certain conditions, independently of said levers.

It will be observed that when the cotter 55 is placed as shown in Figs. 6 or 7, the segment 34ª may be moved by operating the lever 34 without unlocking the latter from the segment, but that when the cotter 55 is placed as shown in Figs. 2 or 5, the lever 34 must be unlocked from the segment 34ᵃ before said lever can be operated, and that in either case, one of the cultivator gangs may be raised independently of the other.

When the cotter 55 is inserted through the hole 51 of arm 35 and through the hole 52 of link 49 (as shown in Fig. 2), the segment 34ᵃ will be rigidly connected with the arm 35 and if the lever 34 be locked to the segment 34ᵃ, the springs 40 and 57 will have no effect upon the shovel gangs. In other words, when the cotter 55 is placed as shown in Fig. 2, the shovel gangs cannot be raised or lowered without operating the lever 34 or the balance lever 63, but at the same time, the entire weight of the gangs will be on the ground. This is important when the ground is hard, as the gangs will be kept down to their work, (especially when sweeps are used).

When the cotter 55 is placed in the hole 52 of link 49, so that it will be between the spring 57 and the arm 35, as shown in Fig. 6,—the balance spring 40, when correctly adjusted, will balance the gang so that the latter can be easily raised, by operating lever 34 without unlocking it from segment 34ᵃ (Fig. 6), or the operator may raise the shovel gangs with his feet (stirrups 66 being provided on the shovel gangs) to free the shovels from accumulated trash, such as sod, weeds and corn stalks.

When the cotter 55 is placed in the hole 54 of link 49, as shown in Fig. 7, the lever 34 can either be raised the same as in the arrangement shown in Fig. 6 or lowered by pressing down on the lever 34, or the operator may force the cultivator gangs downwardly with his feet. This is important, as it allows the operator to force the shovels down into depressions in the field without changing the position of either lever 34 relatively to its segment 34ᵃ. The springs 57 will be strong enough to carry the weight of the gangs and regulate the depth of cultivating if the operator does not press down on the gangs with his feet, and when the balance springs 40 are adjusted correctly, they will not raise the gangs when the ground is not too hard.

When the cotter 55 is placed in the hole 53 of link 49, as shown in Fig. 5, the operator will be enabled to force the shovel gangs downwardly, with his feet, into depressions, but he cannot now raise the shovel gangs with his feet. Either gang may be raised however, by moving one of the levers 34 independently of its segment 34ᵃ, or both gangs may be raised simultaneously by means of the balancing lever 63.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with the frame of a wheeled cultivator, including an arch axle, and a cultivator gang, of a shaft mounted on the frame, a lever and a toothed segment therefor, both loosely mounted on said shaft, a connection between said lever and cultivator gang, a balancing lever secured to said shaft, arms on said shaft, and connections between said arms and the arch axle.

2. The combination with a wheeled frame, and a cultivator gang, of a transverse shaft mounted on the frame, a lever having a hub loose on said shaft, a toothed segment for said lever having a hub loosely mounted on the hub of the lever, and a connection between said lever and the cultivator gang.

3. The combination with a wheeled frame, a cultivator gang, and a shaft mounted transversely on the frame, of a lever and a segment therefor both loose with relation to said shaft, a connection between said lever and the cultivator gang, and adjustable connections between said segment and shaft.

4. The combination with a wheeled frame, and a cultivator gang, of a transverse shaft, a lever and a toothed segment therefor, both loose with relation to said shaft, an arm on the shaft, a link pivotally connected with the segment, and provided with an abutment, means for adjusting the relation of said link to the arm on the shaft, a spring on said link between the abutment thereon and said arm, and a connection between said lever and the cultivator gang.

5. The combination with a wheeled frame, and a cultivator gang, of a transverse shaft, a lever and a segment therefor, both loose with relation to said shaft, a connection between said lever and the cultivator gang, an arm secured to said shaft, a link pivotally connected with said segment and movable with relation to said arm, a spring on said link between its connection with the segment and said arm, and adjusting means for securing said link to the arm and for controlling the relative movements of said link and arm.

6. The combination with a wheeled frame, a cultivator gang, and a transverse shaft, of a lever and a segment therefor, both loose with relation to said shaft, a connection between said lever and the cultivator gang, an arm secured to said shaft and having a hollow boss provided with a pin hole, a link pivotally connected with said segment and passing through said hollow boss, said link having a plurality of pin holes, a pin insertible in any of said pin holes for the purposes set forth, and a spring on said link between its connection with the segment and the boss in said arm.

7. The combination with a wheeled frame, a cultivator gang, and a transverse shaft on said frame, of a lever and a toothed segment therefor, both loose with relation to said shaft, a connection between said lever and cultivator gang, an arm secured to the gang, a link pivotally connected with the segment, means for adjusting the relation of said link to the arm on the shaft, a spring on said link between said arm and the connection of said link with the segment, and means for locking said shaft.

8. The combination with a wheeled frame, a cultivator gang, and a transverse shaft, of a lever and a toothed segment therefor, both loose with relation to said shaft, a connection between said lever and the cultivator gang, an arm secured to said shaft, a link pivotally connected with the segment, means for adjusting the relation of said link to said arm, a spring on said link between said arm and the connection of the link with the segment, a toothed segment secured to the wheeled frame, and a lever secured to said shaft and provided with a detent to engage said last-mentioned segment.

9. The combination with a wheeled frame, a cultivator gang, and a transverse shaft, of a lever and a toothed segment, both loose relatively to said shaft, a connection between said lever and the cultivator gang, an arm secured to said shaft, and having a hollow boss, a link pivotally connected with said segment and passing through said hollow boss, said link provided with an abutment, a spring on said link between said abutment and the hollow boss of said arm, a projection on the hub of said segment and a spring connected at one end with said projection and at the other end with said lever.

10. The combination with a wheeled frame, a cultivator gang, and a transverse shaft, of a lever and a toothed segment therefor, both loose relatively to said shaft, said lever having an arm depending below the shaft, adjustable devices connecting said segment and shaft, a spring adjustably connected at one end with the depending arm of said lever, and means connecting the other end of said spring with the wheeled frame, and a connection between said lever and the cultivator gang.

11. The combination with a wheeled frame including an arch axle, a cultivator gang, a transverse shaft mounted on the frame, arms depending from said shaft, and connections between said arms and the arch axle, of a lever and a toothed segment therefor, both loose relatively to said shaft, said lever having an arm depending below the shaft, adjustable devices connecting said lever and segment, a spring connected at one end to the depending arm of the lever, means connecting the other end of said spring with the wheeled frame, a lever secured to said shaft and a toothed segment for said last-mentioned lever, secured to the wheeled frame, and means connecting the first-mentioned lever with the cultivator gang.

12. The combination with a wheeled frame, a transverse shaft, and a cultivator gang, of a lever and a segment therefor, both loose relatively to said shaft, said shaft having a depending arm, connections between said segment and shaft, connections between said lever and cultivator gang, a spring connected at one end to the depending arm of the lever, a plug in the other end of said spring, and a cranked, threaded rod passing through said plug, and swiveled to the wheeled frame.

In testimony whereof, I have signed this specification in the presence of two subscribing witnesses.

EDWARD M. HEYLMAN.

Witnesses:
 EDWIN NIGAR,
 KATE E. BUCKLEY.